United States Patent [19]

Kaminaka et al.

[11] 4,034,414
[45] July 5, 1977

[54] MAGNETIC HEAD

[75] Inventors: Nobuyuki Kaminaka, Moriguchi; Kenji Kanai, Neyagawa; Norimoto Nouchi, Katano; Noboru Nomura, Kyoto, all of Japan

[73] Assignee: Matsushita Electric Industrial Co., Ltd., Kadoma, Japan

[22] Filed: Dec. 3, 1975

[21] Appl. No.: 637,478

[30] Foreign Application Priority Data

| Dec. 4, 1974 | Japan | 49-139785 |
| Dec. 4, 1974 | Japan | 49-139786 |
| Dec. 4, 1974 | Japan | 49-139787 |
| Dec. 4, 1974 | Japan | 49-139788 |
| Dec. 4, 1974 | Japan | 49-139789 |
| Dec. 4, 1974 | Japan | 49-139790 |
| Dec. 4, 1974 | Japan | 49-139793 |
| Dec. 4, 1974 | Japan | 49-139791 |

[52] U.S. Cl. ................................. 360/113
[51] Int. Cl.$^2$ ............. G11B 5/12; G11B 5/30
[58] Field of Search .......................... 360/113

[56] References Cited
OTHER PUBLICATIONS

Thin Layer Magnetic Head, Hartmann et al., IBM Tech. Disc. Bull., vol. 16, No. 10, Mar. 1974, p. 3278.

*Primary Examiner*—Robert S. Tupper
*Attorney, Agent, or Firm*—Wenderoth, Lind & Ponack

[57] ABSTRACT

A magnetic head in which ferromagnetic thin plates sandwiching a non-magnetic layer between them are arranged on a non-magnetic substrate in such a way that a gap formed by the non-magnetic layer is provided on the side facing the recording medium, and the ends of the ferromagnetic thin plates which are vertically separated by the gap are cross-linked with a magnetoresistance effect element.

8 Claims, 20 Drawing Figures

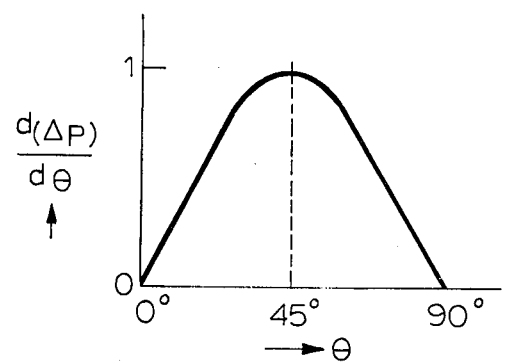
FIG. 3
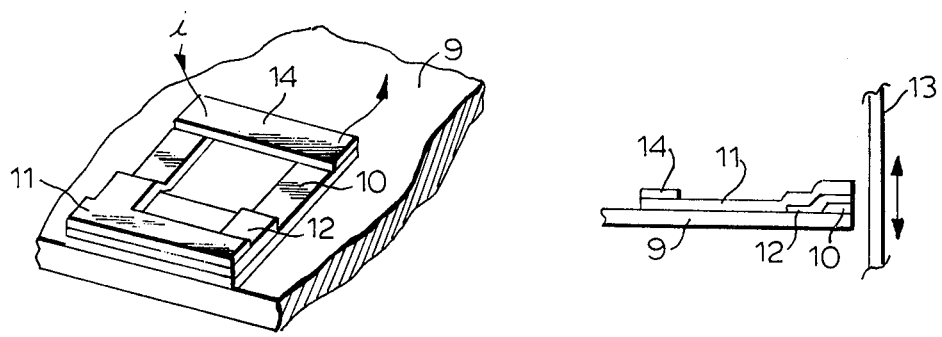
FIG. 4A
FIG. 4B

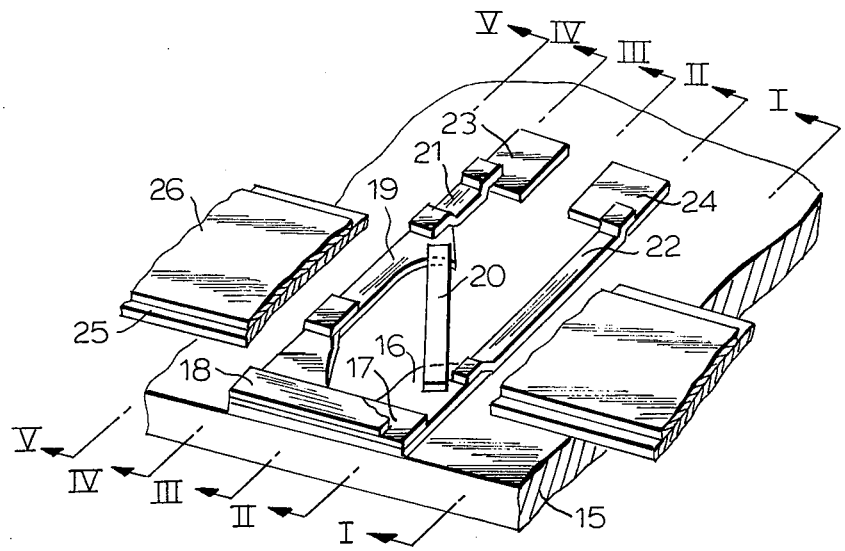
FIG.5

FIG.6 III 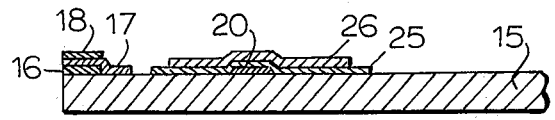

MAGNETIC HEAD

BACKGROUND OF THE INVENTION

The present invention relates to a magnetic head.

Heretofore, a magnetic head in which a magnetoresistance effect element which alters its resistivity when a magnetic field is impressed on the ferromagnetic body is utilized has been used in ways such way as shown in FIG. 1A and 1B.

In the magnetic head shown in FIG. 1A, the magnetoresistance effect element 2 composed of a ferromagnetic thin plate abuts or approaches, in the vertical Y direction, a recording medium 1 (e.g., magnetic tapes, etc.), and electrodes 3 and 4 are provided at both ends of the magnetoresistance effect element 2 as seen in the direction of its length (Z direction); then, with a constant current flowing across the electrodes 3 and 4, the change in electrical resistance in the Z direction due to the signal field in the Y direction induced by the recording medium 1 is detected as a voltage change across the electrodes 3 and 4. In this instance, the strength of the signal field induced by the recording medium 1 attenuates as an exponential function of the width W in the Y direction of the magnetoresistance effect element 2, and especially when the recorded wave length on the recording medium 1 is short, the attenuation of the signal field in the width direction of the magnetoresistance effect element becomes very large. In order to avert such attenuation, the magnetoresistance effect element 2 can be arranged parallel to the recording medium 1, as shown in FIG. 1B. Then, the separation loss in the Y direction is reduced to almost zero. The wear due to the sliding contact with the recording medium 1, however, poses a problem, a real problem practical applications, because the magnetoresistance effect element 2 is generally in a thin plate shape.

The resistivity of the magnetoresistance effect element 2 is given by the equation $\rho = \rho_o + \Delta\rho_{max} \cos^2\theta$, where $\theta$ is the angle between the direction of the magnetization of the ferromagnetic thin plate and the direction of current. Accordingly, the ratio $\Delta\rho/\Delta\rho_{max}$ of the change in the resistivity to the maximum change in the resistivity when plotted on a graph against the impressed magnetic field H produces a noticeable non-linearilty as shown in FIG. 2. It is, therefore, necessary to set the operation point at P in FIG. 2 by applying a bias field for the purpose of avoiding this nonlinearity and widening the dynamic range so far as possible.

Thus, in the magnetoresistance effect element 2, it is necessary from the operation standpoint to achieve a bigger rate of change of resistivity relative to the magnetic field in the range of magnetization rotation of the ferromagnetic material. When the direction of magnetization in the magnetoresistance effect element 2 is rotated by the signal field, the relationship between the ratio $[d(\Delta\rho)/d\theta]$ of the rate of change of resistivity to the rate of change of rotation angle and the rotation angle $\theta$ is shown in FIG. 3, and the ratio $[d(\Delta\rho)/d\theta]$ is a maximum at $\theta$ 45°. That is to say, it is in this state that the sensitivity of the magnetoresistance effect element 2 to the magnetic field is the highest, and moreover, the operation point is set in the widest dynamic range. The change of resistivity in FIG. 3 is normalized by the value $\Delta\rho_{max}$ of maximum change of resistivity. For this purpose, the bias field is impressed in a direction at a right angle to the Z axis direction, which is the current direction in the conventional devices. In this state, the highly magnetic thin plate used as the magnetoresistance effect element 2 should desirably be oriented having uniaxial anisotropy to avoid hysteresis. Accordingly, in the conventional devices, predominant magnetization axis is oriented in the Z axis direction; then, the signal field is impressed in the Y axis or X axis direction, being respectively at right angles thereto, and the bias field is applied in the same direction as that of the signal field. With this arrangement, however, some effect, however small, exerted by the bias field on the recording medium 1 is unavoidable.

SUMMARY OF THE INVENTION

Accordingly, it is the principal object of the present invention to provide a magnetic head wherein the efficiency with which the signal magnetic flux from the recording medium is led to the magnetoresistance effect element is increased, and which involves a smaller contour effect loss and no problem of wear.

This object is achieved by a magnetic head which comprises a nonmagnetic substrate, a nonmagnetic layer, ferromagnetic thin plates sandwiching the nonmagnetic layer arranged on the nonmagnetic substrate in such a way that a gap formed by the nonmagnetic layer is provided on the side facing a recording medium, and a magnetoresistance effect element which links the ends of the ferromagnetic thin plates is vertically separated by the gap.

Other features and advantages of the present invention will be apparent from the following description taken in connection with the accompanying drawings.

BRIEF DESCRIPTION OF THE DRAWINGS

FIG. 3 is a graph relating the ratio of the electrical resistance factor of the magnetoresistance effect element to the change of the angle of rotation to the angle of rotation of magnetization;

FIGS. 4A and 4B are a perspective view and an elevational view, respectively showing the basic structure of the magnetic head of this invention;

FIG. 5 is a perspective view, partly broken away, showing an actual application of this invention;

DETAILED DESCRIPTION OF PREFERRED EMBODIMENTS

Figure 1A:
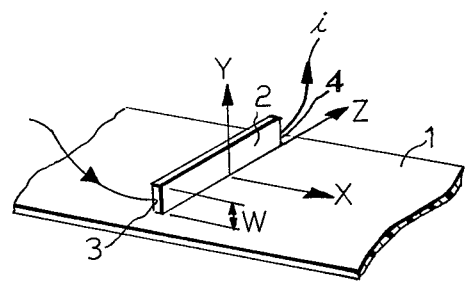
FIGS. 1A, and 1B are perspective views of conventional magnetic heads.
Figure 1B:
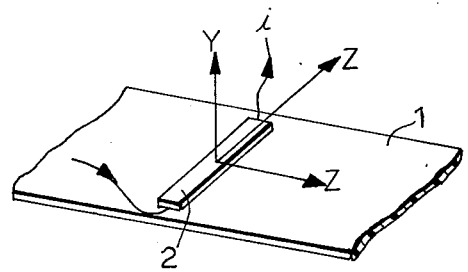
Figure 2:
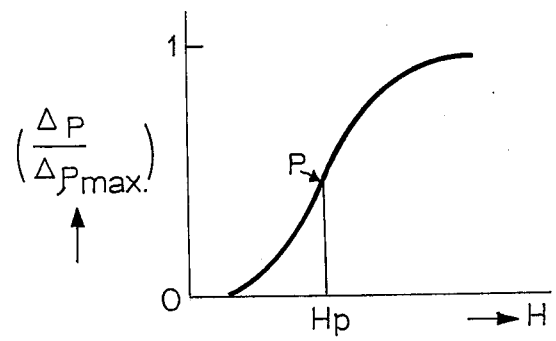
FIG. 2 is a graph relating the electrical resistance factor of the magnetoresistance effect element to the magnetic field.

Referring first to FIG. 4 which demonstrates the basic arrangement of this invention, on a nonmagnetic substrate 9, two ferromagnetic thin plates 10 and 11 are placed parallel thereto with a nonmagnetic layer 12 interposed between them, so that a gap is formed on the side of the surface placed close to the recording medium 13; 14 denotes the magnetoresistance effect element which cross-links the ends of the aforementioned ferromagnetic thin plates 10 and 11 to each other.

In the following, an actual embodiment of this invention is described with reference to FIGS. 5 and 6: As shown in the Figures, on the nonmagnetic substrate 15, a ferromagnetic thin plate 16 (hereinafter referred to as the lower thin plate 16 and another ferromagnetic thin plate 19 (hereinafter referrred to as the intermediate thin plate 19 are arranged; a nonmagnetic layer 17 is provided on the part of the lower thin plate 16 abutting, or approaching, the recording medium; and on the said nonmagnetic layer 17, another ferromagnetic thin plate 18 hereinafter referred to as the upper thin plate 18 is arranged straddling over one end of the aforementioned intermediate thin plate 19, so that a gap is formed by the aforementioned nonmagnetic layer 17 between the aforementioned two thin plates 16 and 18. A magnetoresistance effect element 20 extends between and cross-links the other end of the intermediate thin plate 19 to the lower thin plate 16. On the aforementioned nonmagnetic substrate 15 are thin conductor plates 23 and 24 which serve as the current supplying terminals as well as the voltage detecting terminals, and these thin conductor plates 23 and 24 and the parts respectively of the intermediate thin plate 19 and the lower thin plate 16 located adjacent to the respective ends of the cross-linking magnetoresistance effect element 20 are coupled with band shape conductor thin plates 21 and 22. Furthermore, over the aforementioned nonmagnetic substrate 15, a thin band-shaped conductor plate 26 (hereinafter referred to as a biasing thin plate 26) is provided with a nonmagnetic layer 25 interposed between plate 26 and the magnetic substrate, in such a way that it properly covers the magnetoresistance effect element 20, and that direction of its length is nearly parallel to the surface of the recording medium.

In constructing the magnetic head, it is not impossible to attach the members to one another with an adhesive, but usually, because of the demand on the magnetoresistance effect element for high resistance to increase the detecting voltage, the said element should be made very thin and narrow, and for this reason, the use of adhesive is not practically useful. Then, in integrating a number of members with a high density on a nonmagnetic substrate, such methods as vapor deposition, plating, photoeteching, etc., are most suitable, and in this respect, the structure of the device of this invention permits the use of such methods as vapor deposition plating, photoetching, etc., for easy attainment of high density integration.

The aforementioned lower thin plate 16, intermediate thin plate 19, upper thin plate 18 and the magnetic resistance effect element 20 may be composed, for example, of nickel-iron alloys, nickel-cobalt alloys, iron-aluminum-silicon alloys (Sendust) etc.,; and the nonmagnetic layers 17 and 25, can be composed of SiO, $SiO_2Al_2O_3$, $Si_3N_4$, etc. Practical examples of the thin conductor plates 23 and 24 include nickel-iron alloys, nickel-cobalt alloys, iron-aluminum-silicon alloys (Sendust), aluminum, copper, etc. The band shaped thin conductor plates 21 and 22 and the thin biasing plate 26 may be composed of aluminum, copper, gold, gold-chrome alloys, gold-chromium double layers, etc., while practical examples of the nonmagnetic substrate 15 include glass or such semiconductors as Si or Ge, etc., having an insulating layer of SiO or $SiO_2$, etc., applied on one surface of the semiconductor.

The principle of the aforementioned magnetoresistance effect is expressed by the formula $V = R(\Delta R/R)i$, assuming the resistance of the magnetoresistance effect element to be R, the change of resistance $\Delta R$ and the constant current $i$. Thus, with regard to the magnetoresistance effect elements 14 and 20 shown in FIGS. 4, 5 and 6, the resistance of the element may be raised by making the element thinner, to increase the detecting voltage. With regard to the aforementioned thin ferromagnetic plates 10, 11, 16, 18 and 19, to lead the signal magnetic flux from the recording medium to the magnetoresistance effect element 14 or 20 with high efficiency, these thin plates should preferably be made as thick as possible to reduce the magnetic resistance. If the magnetic resistance of the gap due to the thickness of the nonmagnetic layer (12 in FIG. 4 and 17 in FIGS. 5 and 6) is assumed to be Rg, the magnetic resistance of the magnetoresistance effect element to be Rm, and the magnetic resistances of the thin ferromagnetic plates 10, 11, 16, 18 and 19 coupled between the gap and the magnetoresistance effect element to be $R_{c1}$ and $R_{c2}$, the efficiency $\eta$ with which the signal magnetic flux from the recording medium is led to the magnetic resistance effect element is expressed by the following formula:

$$\eta = \frac{1}{1 + \frac{R_{c1} + R_{c2}}{Rg} + \frac{Rm}{Rg}}$$

To achieve a high efficiency $\eta$, $R_{c1} + R_{c2} << Rg$ is necessary. $R_{c1}$ and $R_{c2}$ are inversely proportional to the sectional areas of the aforementioned thin ferromagnetic plates 10, 11, 16, 18 and 19, and are proportional to the length of the magnetic path. If the integration is made to high densities, the widths of the aforementioned thin ferromagnetic plates 10, 11, 16, 18 and 19 parallel to the surface of the nonmagnetic substrate are prevented from being made very large. Accordingly, smaller values of $R_{c1}$ and $R_{c2}$ may be obtained by making the aforementioned thin ferromagnetic plates 10, 11, 16, 18 and 19 thicker, particularly, thicker than the magnetoresistance element, thereby increasing the efficiency $\eta$.

Figure 6:
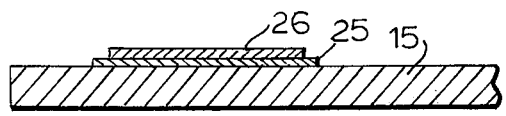
FIGS. 6I–6V, respectively portray sectional views taken along lines I—I, II—II, III—III, IV—IV and V—V in FIG. 5.
Figure 6:
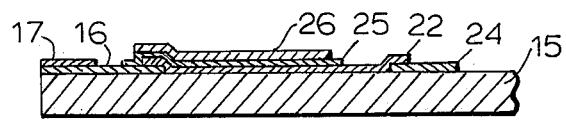
Figure 6:
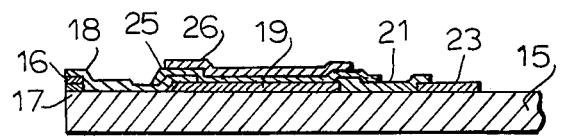
Figure 6:
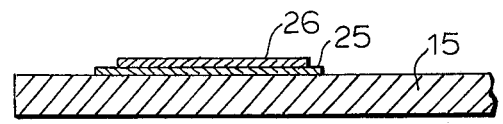

The magnetic head FIGS. 5 and 6 is a magnetic flux focusing type composed of the lower thin plate 16, the upper thin plate 18 and the intermediate thin plate 19. For this reason, the reduction of the magnetic field in accordance with the exponential function of the thickness and the non-uniformity of the distribution of the magnetic field strength in the magnetoresistance effect element as observed in conventional devices can be avoided, and other difficulties with conventional devices are resolved, because the magnetoresistance effect element 10 does not slide directly on the recording medium. Furthermore, since the magnetoresistance effect element 20 is out of contact with the recording medium, the dimensions of the said element 20 may be set independently of the dimensions of the part contacting the recording medium for easy setting of the optimal conditions. For example, with regard to the contour effect loss determined by the length of contact with the recording medium and the recorded wave length, a magnetic head having a smaller contour effect loss may be made by increasing the thickness of the lower thin plate 16 and the upper thin plate 18.

The upper thin plate 18 and the intermediate thin plate 19 may be an integral member. However, the intermediate thin plate 19 needs to be thick in order to make the magnetic resistance as small as possible, and the thickness of the upper thin plate 18 is relevant to the contour effect loss which is determined by the length of contact with the recording medium and the recorded wave length. For these reasons, the intermediate thin plate 19 should preferably be a separate structural element from the upper thin plate 18. This does not result in an increase in the number of manufacturing steps. The reason is because if the lower thin plate 16 and the intermediate thin plate 19 are given the configurations shown in FIG. 5, they may be formed simultaneously by the same step.

Figure 7:
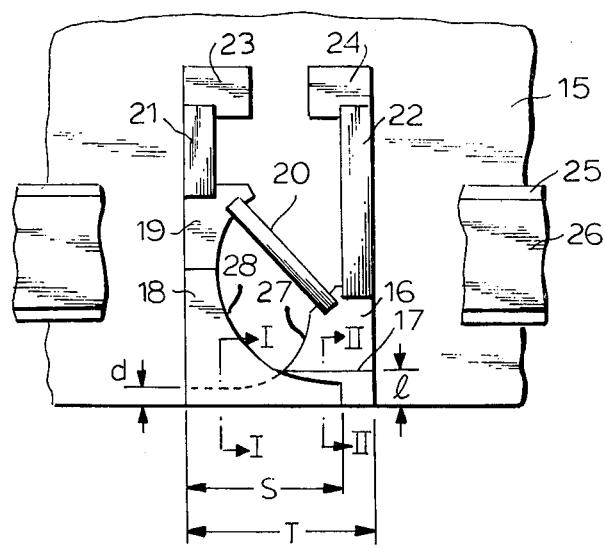
FIG. 7 is a plan view of another actual application of this invention.

The depth $d$ of the gap, as shown in FIG. 7, should be determined in relation to the life expectancy of the head which is in sliding contact with the recording medium, and the preference is for the smallest possible depth $d$ of the gap as far as the magnetic flux focusing efficiency concerns.

As described hereabove, the efficiency with which the signal magnetic flux from the recording medium is led to the magnetoresistance effect element 20 is roughly given by the following formula.

$$\eta \approx \frac{R_g}{R_m} \approx \frac{\omega \cdot t \cdot g \cdot \mu_t}{W \cdot d \cdot l}$$

where $\omega$, $t$, $l$ and $\mu_t$ respectively represent the width, thickness, length and the specific permeability, and W and g stand for the track width and the gap length. This formula indicates that the magnetic flux focusing efficiency may be elevated by making the gap depth $d$ small, as described previously. On the other hand, in order than the signal magnetic flux from the recording medium detected at the gap may be led with a high efficiency from the upper thin plate 18 or the lower thin plate 16 through the intermediate thin plate 19 to the magnetoresistance effect element 20, it is desirable to have configurations that encourage continuous and smooth changes of the direction of the said signal magnetic flux.

For this purpose, in the embodiment shown in FIG. 7, the profile 27 of the inside edge of the lower thin plate 16 and the profile 28 of the inside edge of the upper thin plate 18 are in the shape of a circular arcuate curve or an exponential functional curve. In this way, it is also possible to reduce the effective gap depth in the track width direction.

Figure 8:
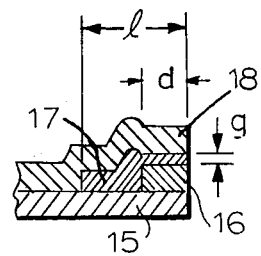
FIGS. 8I and 8II, respectively denote sectional views taken along lines 8I—8I and 8II—8II indicated in FIG. 7.
Figure 8:
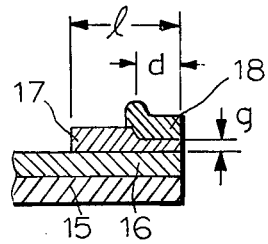

To further elevate the magnetic flux focusing efficiency, the amount of signal magnetic flux leaking from between the lower thin plate 16 and the upper thin plate 18 in the neighborhood of the gap formed by the interposed nonmagnetic layer 17, needs to be reduced. While with regard to the nonmagnetic layer 17 having the width $l$ as shown in FIGS. 7 and 8I and 8II, since the lower thin plate 16 and the upper thin plate 18 are obviously required to be physically out of contact with each other, the thickness should be unaltered over the gap depth $d$, and the thickness over the part $(l - d)$ which is the part of the said width $l$ outside the gap depth $d$ which is larger than the gap length $g$ (refer to FIGS. 8I and 8II). In that way, not only is the gap depth $d$ easily controllable, but because of the thicker nonmagnetic layer 17 in the part $(l - d)$, the magnetic path between the lower thin plate 16 and the upper thin plate 18 is lengthened, thereby reducing the leakage of the magnetic flux at the rear of the gap. Accordingly, the equivalent magnetic resistance at the gap is increased, making it possible to raise the efficiency with which the magnetic flux from the recording medium is led to the magnetoresistance effect element 20.

As shown in FIG. 7, the track width of the magnetic head is determined by the width S of the upper thin plate 18; the width T of the lower thin plate 16 is required only to be larger than S, and the mechanical tolerance for the width T may be loosely set. To be sure, the lower thin plate 16 may be made narrower than the upper thin plate 18, but in that case, the width of the lower thin plate 16 governs the track width of the magnetic head.

As shown with regard to conventional devices, the operational principle of the magnetoresistance effect element indicates that when the direction of magnetization of the magnetoresistance effect element is rotated by the signal magnetic field, the relationship between the ratio $[d(\Delta\rho)/d\theta]$ of the rate of change of the resistance to the change of the angle of rotation and the angle of rotation $\theta$ is a maximum at $\theta = 45°$, as shown in FIG. 3. That is to say, in this state, the sensitivity of the magnetoresistance effect element 20 to the impressed magnetic field is the highest, thus permitting the operating point to be set in a wide dynamic range.

Figure 9:
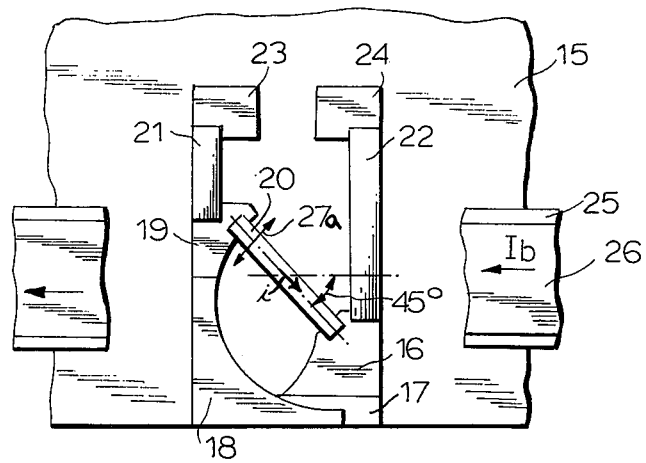
FIG. 9 is a plan view showing the orientation of the magnetoresistance effect element and its relative position in an actual application of this invention.

Accordingly, in the embodiment shown in FIG. 9, the magnetoresistance effective element 20 is inclined at about 45° to the direction of the length of the thin biasing plate 26. In this instance, the dominant magnetization direction of the magnetoresistance effect element 20 is oriented, as indicated by the arrow 27a, at a right angle to the signal magnetic field.

In this state, the direction of the constant current $i$ is preliminarily inclined 45° to the bias field created by the bias current $I_b$, so that the operating point may be readily set with the direction of magnetization in the magnetoresistance effect element 20 inclined 45° from the direction of the constant current $i$. Thus, in conventional devices, when the bias current is running in a direction at a right angle to that of the constant current $i$, and it is desired to obtain the optimal operating by inclining the direction of magnetization 45° to the direction of the constant current, it is fairly difficult to set the optimal bias current. In the device of this invention, however, the bias current for obtaining the optimal operating point is easily set.

Figure 10:
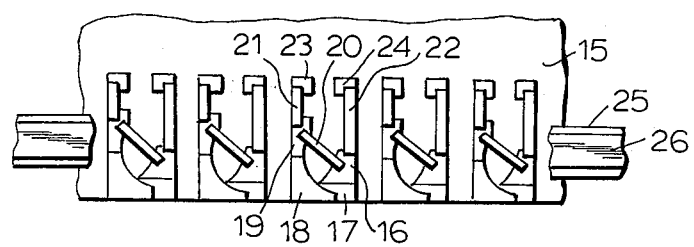
FIG. 10 is a plan view illustrating the application as a multi-channel head of the structure of FIG. 9.

In FIG. 10, the arrangement of an embodiment of this invention in a multi-channel head is illustrated.

Figure 11:
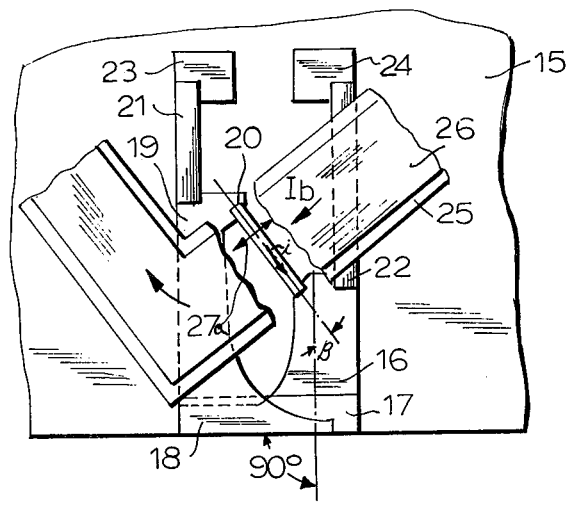
FIG. 11 is a plan view showing a modification in the relative positions of the magnetoresistance effect element and the bias field impressing conductor in an actual application of this invention.

The optimal operating point is obtained by applying the bias field to the magnetoresistance effect element 20 by letting the bias current flow in the aforementioned thin biasing plate 26. In order that the magnetoresistance effect element 20 be uniformly magnetized, the thin biasing plate 26 needs to be wide enough to cover the magnetoresistance effect element 20. While in the device of FIGS. 5 and 6, the biasing thin plate 26 is positioned over the magnetoresistance effect element 20 with a nonmagnetic layer 25 therebetween, another arrangement is possible in which the thin biasing plate 26 is placed on the nonmagnetic substrate 15, then the nonmagnetic layer 25 is placed thereon, and successively there is coated on top of this layer the lower conductive plate 16 and the intermediating thin plate 19, and finally, the magnetic resistance effect element 20. When this invention is incorporated into a multi-channel head, as shown in FIG. 10, the thin biasing plate 26 operates as a common biasing plate for each channel. This structure lends itself to ease of manufacture when the channels of the multi-channel head are mounted at a high density on the nonmagnetic substrate 15. While with regard to the above-described structure, the thin biasing plate 26 is shown as positioned with its length almost parallel to the surface abutting, or approaching, the recording medium, it may be arranged to lie at a right angle to the magnetoresistance effect element 20 which is positioned at a certain angle $\beta$ to the normal direction of the surface abutting, or approaching, the recording medium, as shown in FIG. 11. In this state, as the angle $\beta$ approaches 90°, the bias field created by the bias current $I_b$ comes close to a right angle to the signal field, making it possible to eliminate the effect of the biasing field on the recording medium. However, some problems with regard to the design of the biasing thin plate 26 emerge. The angle $\beta$ should thus be determined with this in mind. The magnetoresistance effect element 20 has uniaxial anisotropy, having the dominant magnetization direction in the direction of the length of said element 20, i.e., at a right angle to the direction of the current $i$.

Figure 12:
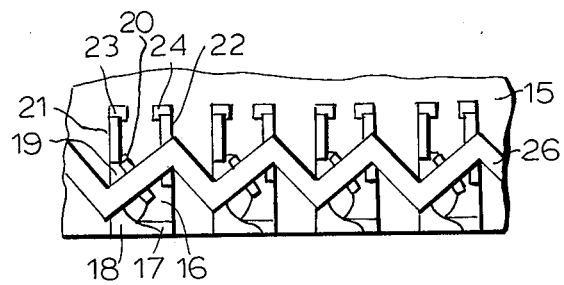
FIG. 12 is a plan view illustrating an application as a multi-channel head of the structure of FIG. 11.
Figure 13:
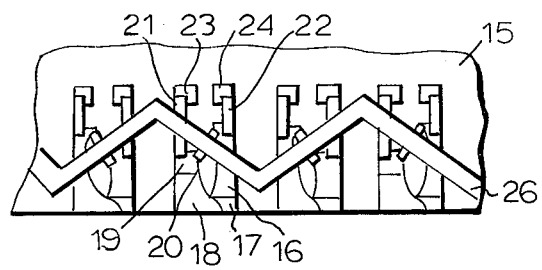
FIG. 13 is a plan view illustrating another application as a multi-channel head of the structure of FIG. 11.

FIGS. 12 and 13 show arrangements of a thin biasing plate 26 in a multi-channel head. In the arrangement of FIG. 13, as compared with that of FIG. 12, the number of bends in the thin biasing plate 26 is small, an advantageous feature in forming the magnetic head as an integrated circuit with a high channel density. Since the magnetoresistance effect element 20 of each magnetic head needs to be arranged to lie criss-cross to the direction of the biasing current $I_b$, however, the position of alternate magnetic heads of FIG. 13 should be reversed. In FIGS. 12 and 13, the nonmagnetic layer 25 which insulates the thin biasing plate 26 is omitted, and the thin biasing plate 26 is made narrower than the length of the magnetoresistance effect element 20 for better understanding of the positions of the elements, but the actual arrangements are as shown in FIG. 11.

The magnetic head of this invention, being, as described hereabove, a magnetic head having thin ferromagnetic plates provided on the nonmagnetic substrate, sandwiching a nonmagnetic layer between them to form a gap on the side facing the recording medium; the ends of the lower ferromagnetic thin plate and the upper ferromagnetic thin plate vertically separated by the aforementioned gap are directly connected, or with the magnetic flux intermediate ferromagnetic thin plate out of contact with the aforementioned lower ferromagnetic thin plate but on a common plane therewith, the end of the upper ferromagnetic thin plate placed on the aforementioned nonmagnetic layer is linked to the aforementioned magnetic flux intermediating ferromagnetic thin plate, and the end of the said magnetic flux intermediate ferromagnetic thin plate and the end of the aforementioned lower ferromagnetic thin plate are cross-linked with the magnetic resistance effect element; in which the aforementioned ferromagnetic thin plates are made thicker than the magnetoresistance effect element; the aforementioned two ferromagnetic thin plates have the profiles of the edges facing each other circular arcuate curves or exponential functional curves; and the part $(l-d)$ of the aforementioned nonmagnetic layer having a width $l$, i.e., the part outside the part corresponding to the gap depth $d$, is larger than the gap length $g$; accordingly, the efficiency at which the signal magnetic flux from the recording medium is led to the magnetoresistance effect element is increased, and moreover, such a magnetic head involves no problem of wear, because the magnetoresistance effect element does not make direct contact with the recording medium.

Furthermore, by the provision of the magnetic flux intermediate ferromagnetic thin plate, the magnetic flux intermediate magnetic thin plate and the upper ferromagnetic thin plate can be provided not as an integral member but as separate thin plates. In that way, the magnetic resistance can be further reduced. The thickness of the upper ferromagnetic thin plate has an effect on the contour effect loss which is determined by the length of its contact with the recording medium and the recorded wave length, but a free choice of the thickness is permitted by forming the upper ferromagnetic thin plate separately from the magnetic flux intermediate ferromagnetic thin plate, making it possible to obtain a magnetic head having smaller contour effect loss.

The magnetic head of this invention is further characterized in that the track width of the magnetic head is controlled by the width of either one of the aforementioned two ferromagnetic thin plates, but the other ferromagnetic thin plate is made wider than the said track width; accordingly, when it is necessary to exactly control the track width, correct setting of the width is required only for either one of the two ferromagnetic thin plates (the upper thin plate 18 or the lower thin plate 16 in the disclosed embodiment), an advantageous feature lending itself to substantial ease of manufacture.

Furthermore, in the magnetic head of this invention, the thin biasing plate is provided over the aforementioned magnetoresistance effect element, and the setting of the bias current to obtain the optimal operating point may be facilitated by arranging the said magnetoresistance effect element with the length of the aforementioned magnetoresistance effect element inclined about 45° to the length of the aforementioned thin biasing plate. Alternatively, the magnetoresistance effect element may be arranged at an angle to the normal direction to the surface of the magnetic head abutting, or approaching, the recording medium. In this state, the aforementioned thin biasing plate should be arranged crosswire to the magnetoresistance effect element. In forming multi-channel heads, the magnetic heads may be easily formed as an integrated circuit, if they are arranged as shown in FIGS. 12 and 13.

What we claim is:

1. A magnetic head which comprises: a non-magnetic substrate, a first thin ferromagnetic plate member on said non-magnetic substrate; a non-magnetic layer on said first thin ferromagnetic plate member; a second thin ferromagnetic plate member on said non-magnetic layer, the plate members, the non-magnetic layer and the substrate having edges aligned and the non-magnetic layer separating the plate members in a direction perpendicular to said substrate for defining a gap between said plate members for facing a recording medium; the ferromagnetic plate members having end portions extending away from said aligned edges on said substrate and having signal output means coupled to said end portions, the end portion of one of said plate members being spaced along said substrate from the end portion of said other plate member; a magnetoresistance effect element connected between the end portions of said plate members remote from said aligned edges for magnetically linking the ferromagnetic plate members; and bias plate means overlying said plate members and said magnetoresistance effect element and parallel to the surface of the non-magnetic substrate.

2. A magnetic head according to claim 1, wherein thin ferromagnetic plate members are plates which are thicker than the magnetoresistance effect element.

3. A magnetic head according to claim 1, wherein the nonmagnetic layer has a gap portion with a dimension in the direction perpendicular to the exposed edge which is the gap depth, and the part of the nonmagnetic layer other than the part corresponding to the gap depth has a dimension in the direction between the thin ferromagnetic plate members which is greater than the corresponding dimension of the gap portion.

4. A magnetic head according to claim 1, wherein the magnetic head has a track width corresponding to the dimension of one of the two thin ferromagnetic plate members in a direction parallel to the recording medium and transverse to a recording track thereon, the other thin ferromagnetic thin plate member having a corresponding dimension greater than the track width.

5. A magnetic head according to claim 1, wherein said bias plate means comprises a thin biasing plate covering the magnetoresistance effect element, the magnetoresistance effect element having the length direction thereof inclined at about 45° to the length direction of the thin biasing plate.

6. A magnetic head according to claim 1, wherein said bias plate means comprises a thin biasing plate overlying said plate members and said magnetoresistance effect element and which is parallel to the surface of the nonmagnetic substrate and the edges of said plate members facing the recording medium and which is sufficiently wide to cover the magnetoresistance effect element, and an intermediate nonmagnetic material between the magnetoresistance effect element and the thin biasing plate.

7. A magnetic head according to claim 1, wherein said bias plate means comprises a thin biasing thin plate which is at a right angle to the length direction of the magnetoresistance effect element, and wherein the magnetoresistance effect element is at an angle to a direction normal to the surface of the recording medium which the magnetic head is to abut or face.

8. A magnetic head which comprises: a nonmagnetic substrate; a first thin ferromagnetic plate member on said nonmagnetic substrate; a nonmagnetic layer on said first thin ferromagnetic plate member; a second thin ferromagnetic plate member on said nonmagnetic layer, the plate members, the nonmagnetic layer and the substrate having edges aligned and the nonmagnetic layer separating the plate members in a direction perpendicular to said substrate for defining a gap between said plate members for facing a recording medium; the ferromagnetic plate members having end portions extending away from said aligned edges, the end portion of one of said plate members being on said substrate; an intermediate thin plate member on said substrate having one end connected with the end portion of said other plate member; signal output means coupled to the end portion of said one plate member and to the other end of said intermediate plate member, the end portion of said one plate member and the intermediate member being spaced along said substrate; a magnetoresistance effect element connected between the end portion of said one plate members remote from said aligned edges and to the other end of said intermediate member for magnetically linking the ferromagnetic plate members; and bias plate means overlying said plate members and said magnetoresistance effect element and parallel to the surface of the nonmagnetic substrate.

* * * * *